United States Patent

[11] 3,619,447

[72] Inventors Bernard A. Kerna; Lawrence J. Manning; Alexander Taleff, all of Pittsburgh, Pa.

[21] Appl. No. 4,486
[22] Filed Jan. 21, 1970
[23] Division of Ser. No. 675,841, Oct. 17, 1967, Pat. No. 3,529,320
[45] Patented Nov. 9, 1971
[73] Assignee Westinghouse Electric Corporation Pittsburgh, Pa.

[54] CASTING METHODS FOR ENCAPSULATING ELECTRICAL CONDUCTORS

5 Claims, 3 Drawing Figs.

[52] U.S. Cl. .......... 264/102, 117/61, 264/272
[51] Int. Cl. .......... B29c 6/02
[50] Field of Search .......... 264/101, 102; 117/61, 119; 118/49, 50; 18/4 R, 4 P, 20 C, 20 RR, 30 V

[56] References Cited

UNITED STATES PATENTS 2,477,273 7/1949 Tognola .......... 264/102
2,858,795 11/1958 Walker .......... 117/61 X
3,413,391 11/1968 Carroll et al. .......... 264/102

*Primary Examiner*—Robert F. White
*Assistant Examiner*—J. H. Silbaugh
*Attorneys*—A. T. Stratton, F. E. Browder and D. R. Lackey

ABSTRACT: Casting methods for at least partially encapsulating electrically conductive means in an insulating resin system. The casting methods include indexing a rotary carriage which contains a plurality of vacuum chambers, loading a casting mold at one of the index positions, evacuating the loaded vacuum chamber with a first vacuum system at another index position, transferring the vacuum chamber from the first vacuum system to a second vacuum system, maintaining the vacuum provided by the second vacuum system at certain subsequent indexing positions, introducing a resin system into an evacuated vacuum chamber at one of the index positions at which the vacuum system is being maintained by the second vacuum system, to fill the mold contained therein, degassing the poured resin system at another of the index positions at which the vacuum is maintained by the second vacuum system, returning the vacuum chamber to atmospheric pressure at another index position, and unloading the filled mold at still another index position.

FIG. I.

CASTING METHODS FOR ENCAPSULATING ELECTRICAL CONDUCTORS

CROSS REFERENCE TO RELATED APPLICATION

This application is a division of application Ser. No. 675,841, filed Oct. 17, 1967, now U.S. Pat. No. 3,529,320 Aug. 22, 1970.

BACKGROUND OF THE INVENTION

1. Field of the Invention

The invention relates to methods for at least partially encapsulating electrical conductors, such as coils, windings, and electrical bushing conductor studs, with a pourable cast resinous solid insulation system.

2. Description of the Prior Art

Prior art encapsulating methods generally utilize the batch principle, wherein molds are introduced into a vacuum chamber, the vacuum chamber is evacuated, the resin system is poured, the chamber is brought back to atmospheric pressure, and the filled molds are removed. While this method produces acceptable encapsulated electrical devices, production capabilities are limited due to the length of time required for the various steps of the process. Increasing the number of batch operations to provide the required production rate is not an economical solution, as it is very costly due to the duplication of apparatus, and it requires a large number of operating personnel, as well as extensive floor space. It would be more desirable to provide new and improved methods for encapsulating electrical conductors, which substantially increase the production capability of the apparatus, compared with batch type methods, without a corresponding increase in cost, floor space and operating personnel.

SUMMARY OF THE INVENTION

Briefly, the present invention discloses a new and improved method for casting pourable solid resinous insulating systems about electrical conductors, which includes indexing a plurality of vacuum chambers in a circular pattern, through a plurality of index positions, loading a mold or molds into the vacuum chambers at one of the index positions, providing a vacuum in the loaded vacuum chambers with a first vacuum system at another index position, transferring the vacuum chambers from the first vacuum system to a second vacuum system, and maintaining the vacuum in the vacuum chambers with the second vacuum system for a predetermined number of subsequent index positions, introducing a resin system into the vacuum chambers while at one of the index positions where the vacuum is being maintained by the second vacuum system, degassing the poured resin system while at another of the index positions where the vacuum is being maintained by the second vacuum system, bleeding air into the vacuum chambers to return them to atmospheric pressure while at another index position, and unloading the filled mold or molds from the vacuum chambers at another of the index positions.

BRIEF DESCRIPTION OF THE DRAWINGS

Further advantages and uses of the invention will become more apparent when considered in view of the following detailed description and drawings, in which.

DESCRIPTION OF THE PREFERRED EMBODIMENTS

Figure 1:
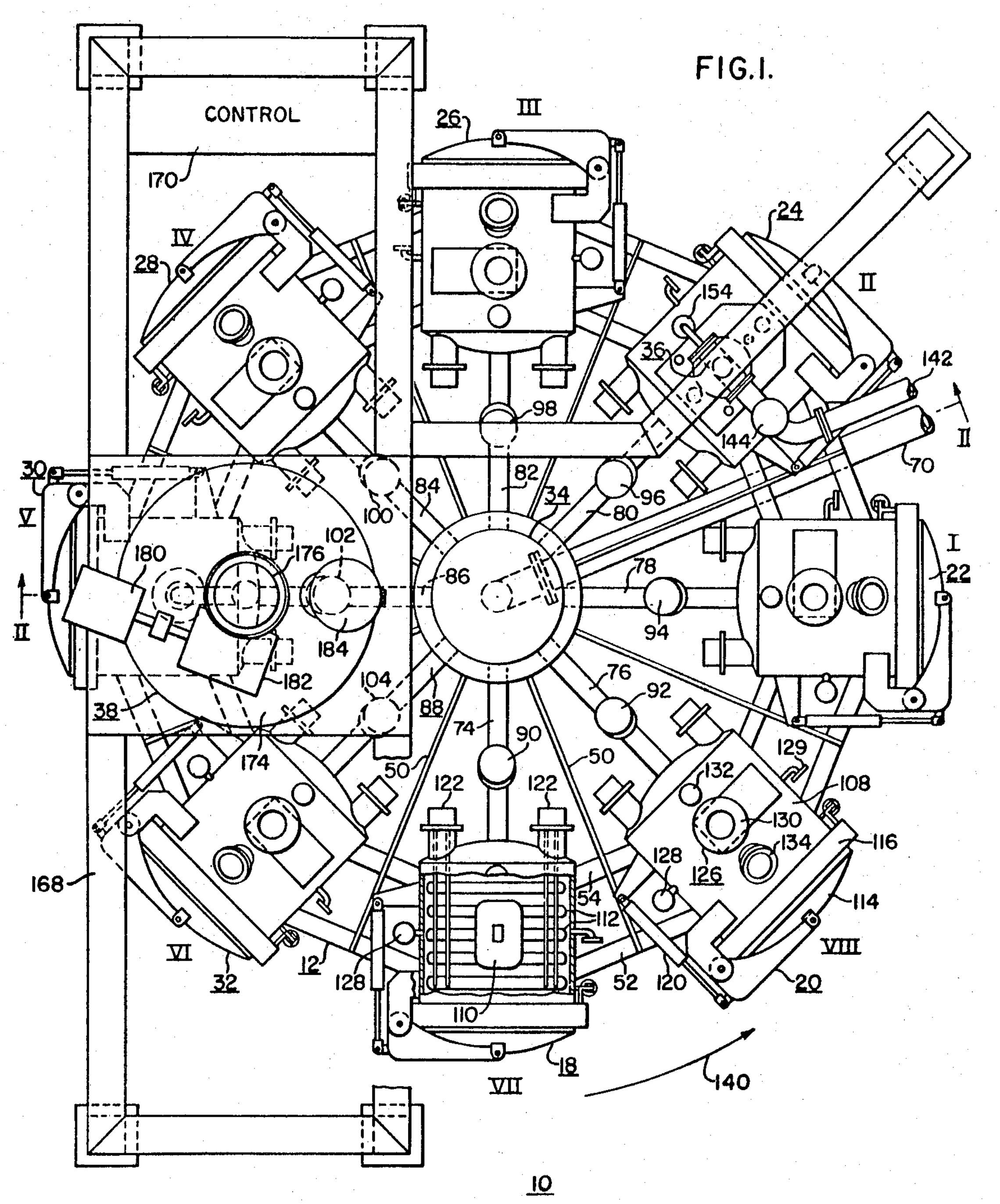
FIG. 1 is a plan view of a casting machine or apparatus which may be used to carry out the teachings of the invention.
Figure 2:
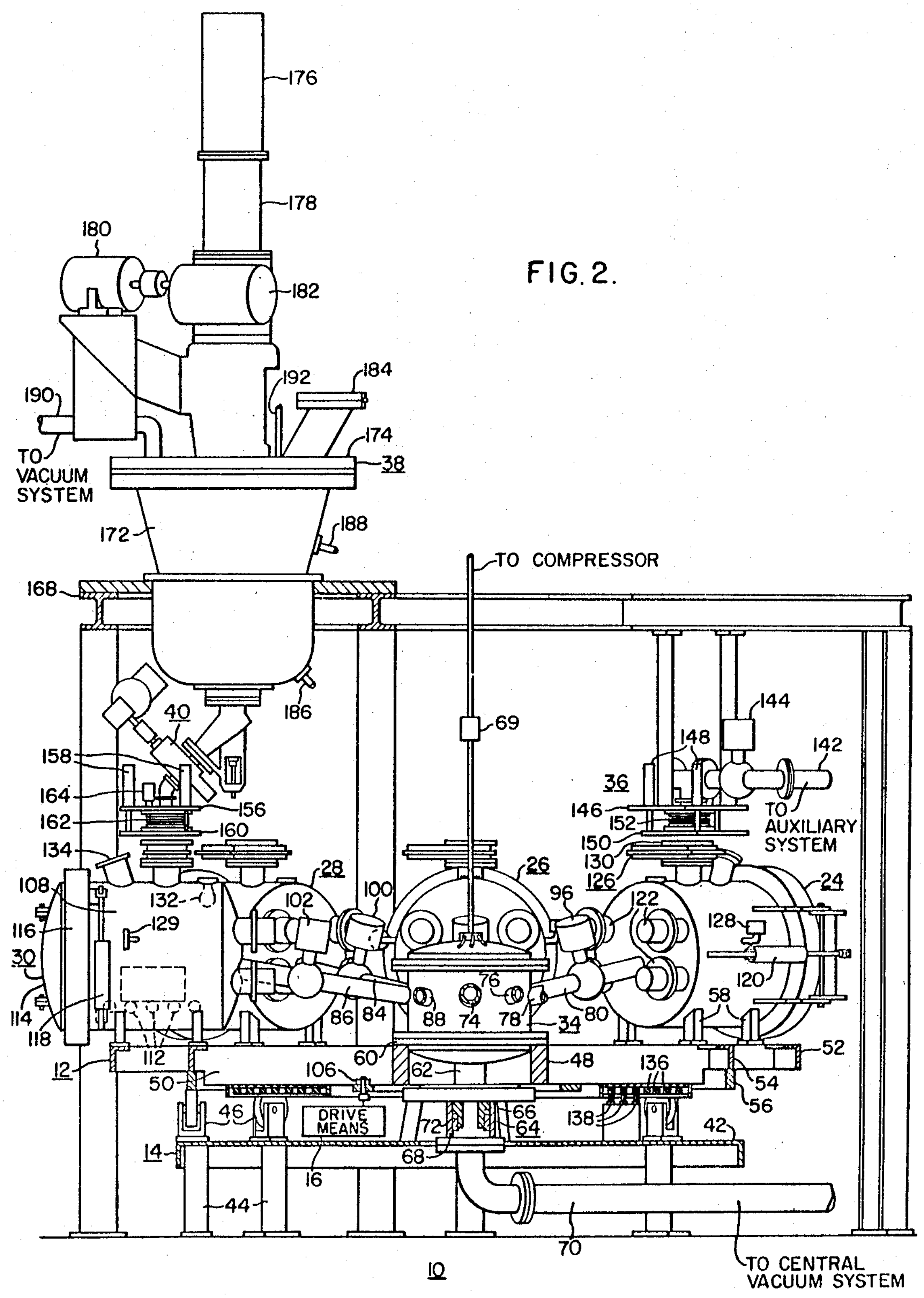
FIG. 2 is an elevational sectional view of the casting apparatus shown in FIG. 1, with the section being taken generally along the lines II—II of FIG. 1.

Referring now to the drawings, and FIGS. 1 and 2 in particular, there is shown plan and elevational views, respectively, of casting apparatus 10 which may be used to carry out the teachings of the invention. In order to more clearly illustrate the construction of the casting apparatus 10, the elevational view in FIG. 2 is a section taken generally along the lines II—II of FIG. 1. In general, casting apparatus or machine 10 comprises a rotatable carriage 12, a supporting base 14, drive means 16 for indexing the rotatable carriage 12, a plurality of vacuum chambers 18, 20, 22, 24, 26, 28, 30 and 32 disposed in spaced relation on the carriage 12, a central vacuum system distributable to the various vacuum chambers through manifold means 34, means 36 connectable to the vacuum chambers for providing an initial vacuum in the vacuum chambers, means 38 for mixing and storing the components of the resin system, and dispensing means 40 for metering and dispensing the resin system into the vacuum chambers at the proper time.

Supporting base 14 may be of any suitable construction, for example, having a structural steel bed 42 which is elevated and supported by a plurality of steel leg members 44. A plurality of upstanding roller members 46 are disposed on bed 42, equally spaced about the circumference of a predetermined circle for supporting and allowing rotary movement of the carriage 12.

Carriage 12 is a substantially circular wheel or spiderlike structure, having a steel tubular inner member 48 which forms the "hub" of the wheel, and a plurality of radially extending web portions 50 which are welded to the tubular member 48. The supporting members for the vacuum chambers, such as vacuum chamber 18, are formed by welding steel channel members between the plurality of webs 50, to form two spaced, concentric, substantially ring-shaped supporting members 52 and 54. Supporting members 52 and 54 are radially spaced to support the mounting feet of the various vacuum chambers.

Welded to the bottom of the substantially ring-shaped supporting member 54 is a cylindrical ring or bearing member 56 which rests on the plurality of upstanding rollers 46 mounted on the bed 42.

The vacuum chambers 18, 20, 22, 24, 26, 28, 30 and 32 each have mounting feet, such as feet 58 on vacuum chamber 24, which are bolted, or otherwise suitably fixed to support members 52 and 54, with the vacuum chambers being equally spaced about the perimeter of supporting members 52 and 54.

The vacuum manifold 34 for distributing the vacuum from the main vacuum system (not shown) has a circumferential flange which is bolted to a washerlike plate member 60, with member 60 being welded to the upper end of the inner tubular member 48. Manifold 34 extends downwardly through the washerlike member 60, into the central opening of the inner tubular member 48, and has a downwardly extending pipe member or conduit 62 which is in communication with the inside of the manifold 34. Conduit 62 is fixed and sealed to a rotary portion 66 of shaft seal assembly 64, which performs the functions of radially guiding the carriage assembly 12 and connecting the stationary central vacuum system with the rotatable manifold 34. The central vacuum system is connected to the stationary portion 68 of the shaft seal assembly 64 via conduit or piping means 70. A suitable tubular shaft seal 72 is mounted on the internal surface of the stationary portion 68 of shaft seal assembly 64, and has an inside diameter which snugly fits the rotatable portion 66 of the shaft seal, allowing the portion 66 to rotate, but sealing the shaft against air leakage into the vacuum system. Suitable radial bearings (not shown) are disposed at both ends of the shaft seal 72 in order to guide the carriage 12 when it is being rotated.

The vacuum manifold 34 is connected to vacuum chambers 18, 20, 22, 24,26,28, 30 and 32 through radially extending conduit means 74, 76, 78, 80, 82, 84, 86 and 88, respectively, and each conduit means includes an electrically operated valve for operatively connecting or disconnecting each vacuum chamber with the vacuum manifold 34, such as valves 90, 92, 94, 96, 98, 100, 102, and 104, respectively. Thus, each vacuum chamber may be individually and selectively connected to the vacuum manifold 34 and thus to the central vacuum system through its associated electrically operated valve.

Rotatable carriage means 12 is indexed by drive means 16, which includes air or hydraulically operated cylinder means which successively engage a plurality of spaced pins on the carriage 12, such as pin 106, to move the vacuum chambers through a plurality of index positions. Since in this embodiment of the invention there are eight vacuum chambers, each index of the drive means 16 will be arranged to rotate the carriage 45°. The various processing steps for encapsulating the electrical conductors in solid resinous insulation are performed at various index positions, as will be hereinafter explained.

Each of the vacuum chambers 18, 20, 22, 24, 26, 28, 30 and 32 are similar in construction, having a vacuum chamber formed by a substantially cylindrical housing 108 which has its axis horizontally disposed, with housing 108 having an open end which faces radially outward for receiving the mold which is to be filled with the resin system, such as the mold 110 shown in vacuum chamber 18. Vacuum chamber 18 is shown partially cut away in FIG. 1 to illustrate the mold 110 and the support rails 112 for holding the mold 110 in the vacuum chamber.

The open end of housing 108 is closed by a door 114, which is sealed by turning a locking ring 116. Locking ring 116 may be automatically actuated by an air cylinder, such as cylinder 118, and the door 114 may be opened and closed by an air cylinder, such as cylinder 120.

The vacuum chamber may be heated by a plurality of heaters at certain times during the processing cycle, such as electrically operated heaters 122, shown most clearly on vacuum chamber 18 in FIG. 1. However, in most applications auxiliary heat is not required, and heat transfer through the vacuum is so poor that very little heat is lost from the initially heated electrical conductor to be encapsulated, and from the heated resin system once it is poured.

Each vacuum chamber also has two valves, a gate valve 126, mounted on the top of the housing 108, and a bleed valve 128 mounted at any convenient location on the housing 108. The gate valve 126, which may be operated by an air cylinder, has a flat upper plate 130 which has a suitable opening therein, with a groove and O-ring combination surrounding the opening such that the O-ring extends slightly above the surface of the plate 130. Thus, as will be hereinafter explained, when access to the internal portion of the vacuum chamber is to be obtained through the gate valve 126, the opening of the gate valve may be sealed by a flat plate pressed against the plate 130 and its sealing O-ring.

Bleed valve 128, which may be electrically operated, provides the function of bleeding air into the vacuum chamber after it has been effectively disconnected from the vacuum manifold 34 by its associated main or central vacuum system valve, such as valve 96 associated with vacuum chamber 24, when it is desired to return the vacuum chamber to atmospheric pressure, to allow door 114 to be opened and the mold 110 to be removed therefrom.

The vacuum chamber may also include a light disposed within housing 108, such as light 132 shown in vacuum chamber 30 in FIG. 2, and a sight port 134 which allows visual inspection by an operator such as during the filling of the mold 110 with the resinous insulating system. A vacuum gauge 129 may also be disposed on the outside of each vacuum chamber so that an operator can readily determine the condition of the vacuum in the chamber.

In addition to continuously providing a vacuum to the rotatable carriage 12 from a stationary central vacuum system, it is also necessary to provide electrical power to the carriage 12 for the operation of the various valves, limit switches, lights, control functions, and the electrical heaters, if used. This is accomplished by a plurality of concentrically disposed electrically conductive rings 136, formed of a material such as copper, which are insulatingly mounted to the carriage 12, and which are accessible from below. Brushes 138 are insulatingly mounted on the stationary bed 42, and disposed to contact the rings 136. Thus, electrical power is transferred through the brushes to the rings, with the source of electrical potential being connected to the brushes 138 and the various control functions being connected to the rings 136.

It is also necessary to provide a supply of air to the rotary portion of the casting apparatus 10, and this may be provided by an electrically operated compressor disposed on the carriage 12, or as shown in FIG. 2 it may be provided from a stationary source of air through a rotary air seal 69 and air conduit which may enter the carriage 12 along its vertical axis.

Each vacuum chamber, such as vacuum chamber 18, is permanently connected to the central vacuum system through individual valves, such as valve 90. A vacuum chamber cannot directly "enter" the central vacuum system while it is itself at atmospheric pressure, however, as it would immediately increase the pressure in all of the vacuum chambers which are operatively connected to the central vacuum system. Therefore, after loading a mold into a vacuum chamber and closing and sealing the door, the vacuum chamber must be brought down to substantially the same pressure or vacuum as that of the central system, to allow its central system valve to be opened without adversely affecting the central vacuum system. This may be conveniently accomplished at the index position which follows the loading position. For convenience, the index positions in FIG. 1 are indicated with Roman numerals I through VIII. Thus, in FIG. 1 if it is assumed that index position I is the "load" index position, and the index rotation is counterclockwise as indicated by arrow 140, then index position II is the index position at which the vacuum chambers may be initially evacuated with an auxiliary vacuum system. Accordingly, as shown in FIGS. 1 and 2, means 36 is provided at index position II for evacuating the vacuum chambers, such as vacuum chamber 24, while they are at this index position. Means 36 includes a conduit 142 which is connected to the auxiliary vacuum pump (not shown), a valve 144, which maybe electrically operated, for opening and closing conduit 142 as desired, a stationary horizontally disposed mounting plate 146 which contains a plurality of air cylinders 148 mounted transversely to the plate, and having their operating rods downwardly disposed and connected to a movable plate member 150 through a flexible bellowslike coupling 152. Thus, when vacuum chamber 24 is in index position II, its central system vacuum valve 96 should be closed, and auxiliary vacuum valve 144 should be closed. The air cylinders 148 may then be actuated to lower plate 150, which has an opening therein, against plate 130, with the opening in plate 150 being aligned with the opening in plate 130. The O-ring on the upper surface of plate 130 will be compressed by plate 150, forming a vacuum tight seal. Gate valve 126 on vacuum chamber 24 may then be opened, followed by the opening of the auxiliary vacuum valve 144. When vacuum chamber 24 is evacuated to the desired pressure, which will usually be in the range of 1 –5 mm. of mercury, the gate valve 126 may be closed, followed by the closing of auxiliary valve 144. In order to release the vacuum which will still exist between the two valves 126 and 144, a bleed valve 154, shown in FIG. 1 is opened before the cylinders 148 are actuated to lift the plate 150. As soon as the gate valve 36 on vacuum chamber 24 has closed, following the initial evacuation, the valve 96 to the central vacuum system may be opened. This may be conveniently accomplished with a limit switch upon the indexing of vacuum chamber 24 to index position III. Since the air in the mold and its contents, i.e., the electrical conductors to be encapsulated, may have entrapped air which was not completely removed by the auxiliary vacuum system at index position II, the next two index positions III and IV, in this embodiment of the invention, are used to allow the central vacuum system to remove as much trapped air as possible from the vacuum chambers prior to the pouring of the resin system, maintaining the vacuum in the range of 1–5 mm. of mercury.

After the vacuum chamber and its contents have been under the vacuum for a sufficient length of time to insure removal of substantially all entrapped air, the pourable cast resin system may be introduced into the vacuum chamber and it mold (or molds). As shown in FIGS. 1 and 2, this is accomplished at index position V. The resin system, which has been mixed under vacuum in mixer 38 and held at a predetermined elevated temperature therein, is introduced into the vacuum chamber at index position V, using the same gate valve previously used to provide the initial evacuation. For example, as shown in FIGS. 1 and 2, vacuum chamber 30 is in index position V and the mixer 38 and dispenser 40 are mounted overhead, connected to a sealing arrangement similar to the one used by the auxiliary vacuum system in making the vacuum tight seal with the gate valve 126. The dispensing means 40 has its output end connected through an opening in a horizontally disposed mounting plate 156, which has air cylinders 158 mounted thereon, with the cylinder rods extending downwardly and connected to a plate member 160 which has an opening therein. The openings in plate members 156 and 160 are sealed and interconnected by flexible bellows 162. Thus, when it is desired to introduce the resin system into a vacuum chamber, the air cylinders 158 are actuated, to lower plate 160 against plate 130 to compress its O-ring, and seal the connection between the dispensing means 40 and the vacuum chamber 30. Gate valve 126 may then be opened and dispensing means 40 may meter a predetermined amount of the resin system into the mold contained under vacuum in the vacuum chamber.

When the desired amount of material is metered into the mold, the dispensing means 40 will close its output end, and gate valve 126 may then be closed. Before the cylinders 158 are actuated to lift the plate member 160, bleed valve 164 is opened to release the vacuum between dispensing means 40 and gate valve 126.

The central vacuum system valve is kept open as the carriage 12 is indexed into position VI and while it is in this position, in order to remove any gases from the poured resin which were not removed during the vacuum mixing process.

As the carriage is again indexed, the central vacuum system valve, such as valve 90 on vacuum chamber 18, closes, and then the bleed valve 128 on the vacuum chamber is opened to slowly bring the vacuum chamber back to atmospheric pressure. When the carriage is indexed again, the filled mold may be removed at index position VIII, by first actuating cylinder 118 to unlock and unseal the door, and by actuating cylinder 120 to open the door. The mold may then be removed and put through a predetermined curing cycle to gell and cure the cast resin system.

A complete cycle of casting machine 10 will now be described starting with the vacuum chamber 22 at index position I. Index position I, in this embodiment of the invention, is a load position. Vacuum chamber 22 will index into this position with its door 114 open, and with gate valve 126, bleed valve 128, and central vacuum system valve 94, closed. The mold 110, along with its electrical conductors to be encapsulated, is placed into the vacuum chamber. The loading may be accomplished automatically, such as with a hydraulically operated push rod, and the door 14 may be automatically closed by cylinder 120, and sealed and locked by air cylinder 118 being actuated to turn locking ring 116. The mold and the electrically conductive members disposed therein are preheated to approximately the temperature at which the resin system will be poured, usually in the range of 80° C. to 110° C. The time that casting machine 10 will remain at each index position will be determined by the longest processing step, and this will depend upon the specific application. For example, in the encapsulation of transformer coils, such as disclosed in copending application Ser. No. 675,840, filed Oct. 17, 1967, now U.S. Pat. No. 3,537,677 which is assigned to the same assignee as the present application, in an eight vacuum chamber casting machine the pouring of the resin would usually require the longest time, setting the index time at approximately 2 minutes. If the electrical conductors to be encapsulated require less resin, such as small electrical bushings, then the pouring time, and thus the cycle time, may be substantially reduced. Where smaller devices are to be encapsulated, more than one mold may be placed in each vacuum chamber, if desired.

After loading in index position I, the carriage 12 is indexed 4520 by drive means 16, bringing vacuum chamber 22 to index position II and to the initial evacuation step of the process via the auxiliary vacuum system. The gate valve 126 of vacuum chamber 22 will stop directly under the flexible coupling of the auxiliary vacuum system, and air cylinders 148 will be automatically actuated to lower plate 150 against plate 130 of the gate valve 126, sealing the connection. The gate valve 126 is then automatically opened and valve 144 will then open to evacuate the vacuum chamber to a predetermined value. After the evacuation of the vacuum chamber, valve 144 will close, gate valve 126 will close, bleed valve 154 will open to release the vacuum between valves 126 and 144 and then it will close, and cylinder 148 will lift plate 150.

Vacuum chamber 22 will then be indexed to position III, and while indexing, its valve 94 may be automatically opened. For example, it may be signaled by a microswitch operated by the movement of the carriage. The vacuum in vacuum chamber 22 will be continuously held at both index positions III and IV, with no processing at these two positions. The time provided by these two vacuum holding stations insures that substantially all air entrapped in the mold and the electrical conductors to be encapsulated will be removed. From index position IV, vacuum chamber 22 will be indexed into position V, which is where the pouring of the resin takes place. As the vacuum chamber is indexed into this position, the operator may visually check vacuum gauge 129 to insure that the vacuum is in the proper range for pouring. The pouring step may be automatic, or the operator may control it manually. Cylinders 158 are actuated to press plate 160 against plate 130 of the gate valve, the O-ring in the face of plate 130 will seal the connection gate valve 126 will open, and dispensing means 40 will be actuated to meter a predetermined amount of resin from mixer means 38 into the mold. The dispensing means 40 will then close its outlet, gate valve 126 will close, bleed valve 164 will open to release the vacuum between the dispensing means 40 and the gate valve 126 and cylinders 158 will lift plate 160 to break the coupling.

Although the resin system is vacuum mixed in mixer 38, as will be hereinafter described, it is necessary to degas the poured resin system. Index position VI is used to perform the degassing step. Thus, when chamber 22 is indexed into position VI, its central vacuum system valve 94 will remain open, and entrapped air will continue to be removed from the poured resin system for the duration of this index position.

Vacuum chamber 22 will then be indexed into position VII. At this position, its central vacuum valve 94 will close, and bleed valve 128 will open to slowly bring vacuum chamber 22 back to atmospheric pressure. Casting machine 10 will then index vacuum chamber 22 into position VIII, where the filled mold or molds may be automatically or manually removed. Upon indexing into position VIII, cylinder 118 will be actuated to rotate the locking ring 116 and cylinder 120 will be actuated to open the door 114. The filled molds are ready for the specific cure cycle of the particular resin system used.

The control for logically coordinating the signals from the various limit switches, valves cylinders, microswitches and the like, to insure that all of the functions at each index position have been performed before the drive means 16 indexes the machine to the next position, may be conventional, and is therefore shown generally at 170.

The mixer 38 is mounted on a suitable structural steel framework 168 above the rotatable portion of the casting machine 10, and it includes a hollow tank or body portion 172, which has an opening at its lower end in sealed communication with dispensing means 40, and a top portion 174 which seals the upper end of the mixer tank 172. The mixer tank 172 includes relatively large low speed mixer blades (not shown) and smaller, high speed mixer blades (not shown) driven by coaxial drive shafts disposed vertically through the top portion 174. The high speed drive shaft is coupled directly to motor 176 via coupling 178, and low speed drive shaft is connected to motor 180 through a reduction gear 182.

Any suitable castable resin system may be used to encapsulate the electrical conductors, such as those of the thermoplastic, of thermosetting types. For purposes of example, however, it will be assumed that the resin system is thermosetting and of the epoxy type. Copending application Ser. No. 456,038, filed May 6, 1965, now abandoned, discloses an excellent epoxy resin system that may be used, including an epoxy resin system having an epoxy equivalent weight of about 150–450, an anhydride resin curing agent, a resin curing accelerator, and powdered beryl as the filler. A suitable thixotropic agent may also be added to prevent settling of the filler system. Other excellent epoxy resin systems which may be used are disclosed in application Ser. Nos. 447,237, now abandoned, and 645,319, now U.S. Pat. 3,433,893, filed Apr. 12, 1965 and June 12, 1967, respectively with all of these copending applications being assigned to the same assignee as the present application.

A sealable port or opening 184 is shown in FIGS. 1 and 2 for introducing the components of the resin system, but it is to be understood that the components may be automatically metered and/or weighed and automatically introduced in the mixer 38, if desired. The epoxy resin, its curing agent, and accelerator, are all preheated to a predetermined temperature, such as between 80° C. t0 105°X C., at which temperature they are fluid, and they may be accurately metered and pumped into the mixer tank. The filler and any thixotropic agent, if used, will be solid, and may be automatically weighed and transferred, to the mixer tank 172 through a sealable opening or openings.

Mixer 38, as shown, mixes all of the components of the resin system, thus providing a predetermined limited period of time in which the resin system must be used. It would be equally suitable to divide the resin system into two parts, in which the epoxy resin and its curing agent are separated. Each part would be completely mixed and held in a heated tank, and they would only be mixed together when required. Therefore, the two portions of the system may be held indefinitely, and only mixed when required by the casting machine.

Since the components of the resin system must be mixed and held at a predetermined elevated temperature, the mixer tank 172 may contain heating passages through which a heated liquid, such as ethylene glycol, may be circulated. Pipes 186 and 188 indicate the entrance and exit ends of the passages through the jacket of the mixer tank, respectively.

It is essential that the components of the resin system be at least mixed while under a vacuum, such as a vacuum of 1 –5 mm. of mercury, in order to facilitate the removal of as much air as possible from the system before pouring. If the resin system is not outgassed prior to pouring in the vacuum chamber, splattering of the resin system will occur when it is poured into the evacuated chamber. Pipe 190 indicates the connection of a vacuum system to the mixer tank 172. This vacuum system may be a separate vacuum system, or the auxiliary vacuum system used to provide the initial evacuation of the vacuum chambers may be used.

After mixing the components of the resin system in mixer 38, the mixed resin system may be held under vacuum; or the mixing chamber may be brought back to atmospheric pressure. Once the system is mixed under vacuum, it may be returned to atmospheric pressure and it will absorb very little air. The disadvantage of the system entrapping a small amount of air after mixing, may be offset by the easier transfer of the resin system from the tank 172 to the molds in the vacuum chambers, when the mixing chamber is at atmospheric pressure.

When the mixed resin system in tank 172 has been completely used, the tank may be cleaned before mixing the next batch of resin. Pipe 192 is for connection to a supply of a suitable cleaning fluid, such as thrichloroethylene.

Dispensing means 40 may be a motor and pump combination which will pump and meter the resin system from the tank 172 when it is desired to fill a mold.

Figure 3:
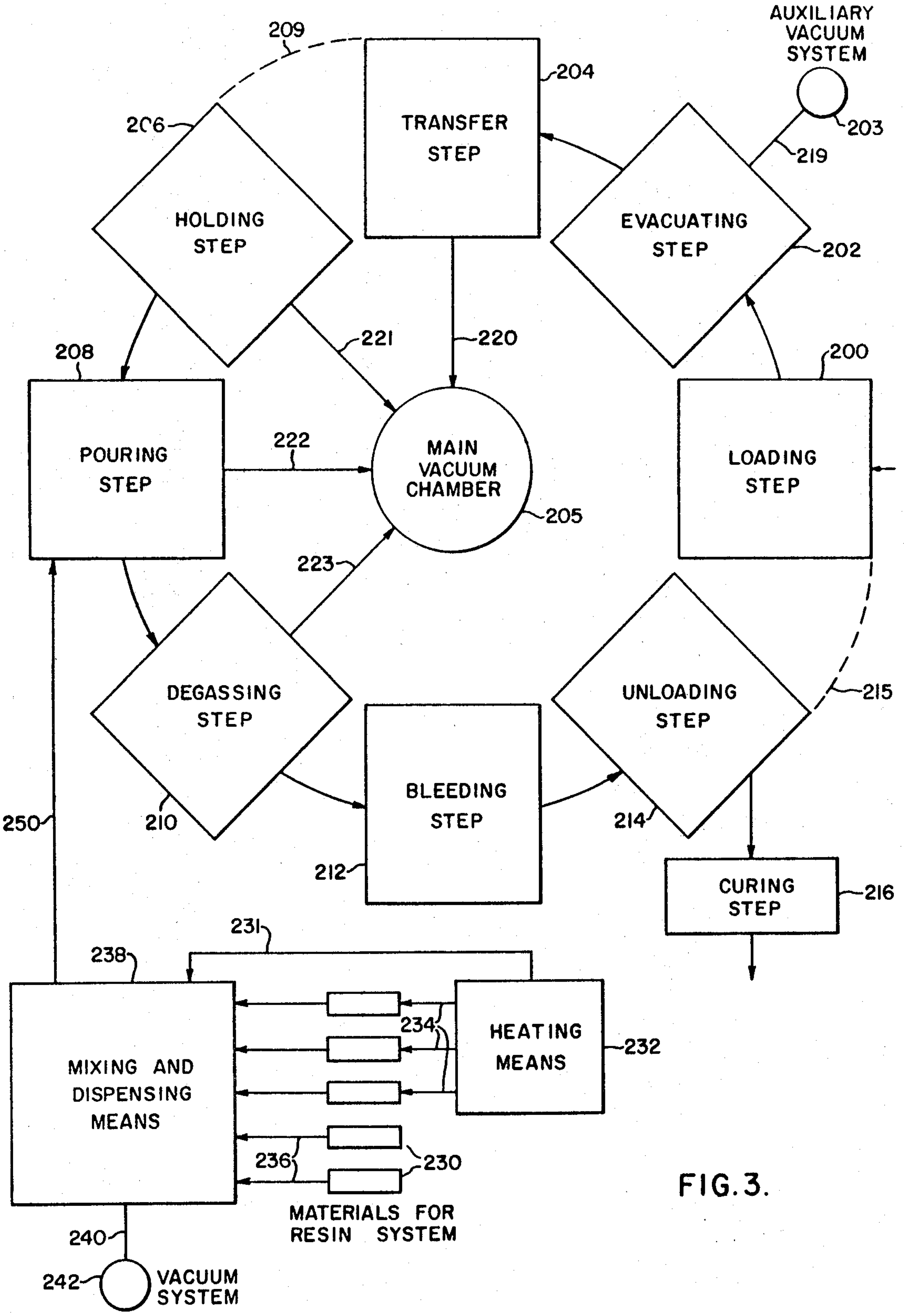
FIG. 3 is a process flow diagram illustrating a method for casting electrical conductors in accordance with the teachings of the invention.

FIGS. 1 and 2 illustrate a casting machine for encapsulating electrical devices in a pourable resin system, according to a new and improved method of substantially continuous casting, which greatly increases the production rate over prior art methods, while reducing the required number of operating personnel. FIG. 3 is a flow diagram which illustrates this method, characterized by the use of a rotary vacuum machine, which utilizes two independent vacuum systems. The flow diagram is shown with general reference to the casting machine 10 shown in FIGS. 1 and 2 in order to illustrate the basic steps of the method and how the casting machine 10 could be arranged to form other embodiments within the scope of the invention.

The first step of the casting method, illustrated by block 200, is the loading of a mold into a vacuum chamber of a rotary casting machine having a plurality of vacuum chambers. The next step of the method, illustrated by block 202, is the evacuation of the vacuum chamber by a first or auxiliary vacuum system, illustrated by line 219 and circle 203. The next step is the transferring of the vacuum chamber from the first vacuum system 203 to a second or main vacuum system, indicated by the line 220 and circle 205. The next step is the holding of the vacuum chamber at a predetermined vacuum, illustrated by block 206 and line 221. Since the transferring and holding steps may be combined into one operation, instead of using two independent index positions of the rotary vacuum casting machine, steps 204 and 206 are shown joined by a dotted line 209. In other words, instead of having two index positions on the casting machine 10 between the evacuating step and the pouring step, it would be entirely practical to utilize only one index position. The time that the electrical conductors to be encapsulated are under vacuum before pouring is determined by the application, as the longer the time under vacuum, the less change there will be of insulation failure due to air bubbles in the insulation. The next step is the vacuum pouring of the resin system, indicated by block 208 and line 222. The next step is the degassing step, indicated by block 210 and line 223, for removing entrapped air from the poured resin system. The next step is the bleeding step, indicated by block 212, during which the vacuum chamber is brought back to atmospheric pressure. The next step is the unloading of the mold from the vacuum chamber, indicated by block 214. Since the loading and unloading of the mold may occur at the same index position of the rotary casting machine, the unloading and loading steps 214 and 200 are shown joined by dotted line 215. The filled molds are then ready for the curing step, indicated by block 216.

The resin system may be prepared by providing the materials which are to be combined into the resin system, indicated by block 230, heating certain of the materials to a predetermined elevated temperature, with suitable heating means illustrated by block 232 and line 234, introducing the material into the mixing and dispensing means, illustrated by lines 236 and block 238, mixing the materials under vacuum, illustrated by line 240 and circle 242, heating the mixed materials, indicated by line 231 and block 232, and dispensing the mixed system to initate the pouring step 208, indicated by line 250.

In summary, there has been disclosed a new and improved method of substantially continuously casting a pourable resin system about electrical conductors, such as electrical windings, in a rotary vacuum casting machine which utilizes two separate vacuum systems. The method includes the steps of loading a mold which contains the electrical conductors to be encapsulated in a vacuum chamber, evacuating the vacuum chamber with a first vacuum system, transferring the vacuum chamber to a second vacuum system, pouring a resin into the mold while the vacuum chamber is connected to the second vacuum system, degassing the poured resin with the second vacuum system, bleeding air into the vacuum chamber to bring it back to atmospheric pressure, unloading the filled molds from the vacuum chambers, and curing the resin system.

Since numerous changes may be made in the above described apparatus and different embodiments of the invention may be made without departing from the spirit thereof, it is intended that all matter contained in the foregoing description or shown in the accompanying drawings, shall be interpreted as illustrative, and not in a limiting sense.

We claim as our invention:

1. A process for at least partially encapsulating electrically conductive means in a castable solid resin system, comprising the steps of:

providing first and second vacuum systems, providing a plurality of vacuum chambers, loading a mold into each vacuum chamber, while the vacuum chamber is at atmospheric pressure, individually evacuating each vacuum chamber with the first vacuum system following the loading step, transferring each vacuum chamber to the second vacuum system, following evacuation thereof by the first vacuum system, enabling entry of each vacuum chamber into the second vacuum system without substantially affecting the level of vacuum in the second vacuum system, indexing each vacuum chamber through a plurality of index positions while connected to the second vacuum system, simultaneously interconnecting the vacuum chambers at these index positions through the second vacuum system, sealingly introducing a resin system into the mold disposed in each vacuum chamber at a predetermined index position, while the vacuum chamber is connected to the second vacuum system, disconnecting each vacuum chamber from the second vacuum system without affecting the level of the vacuum in the second vacuum system, returning each vacuum chamber to atmospheric pressure, after it has been disconnected from the second vacuum system, and unloading the filled mold from each vacuum chamber, after each vacuum chamber is returned to atmospheric pressure.

2. The process of claim 1 including the step of curing the resin system disposed in each mold, after each mold is removed from its associated vacuum chamber.

3. A process for substantially continuously casting a resinous insulating system to at least partially encapsulate electrically conductive means, comprising the steps of:

providing a first vacuum system, providing a second vacuum system having a predetermined level of vacuum therein, providing a rotatable carriage having a plurality of vacuum chambers, and a plurality of index positions, loading a mold containing the electrically conductive means to be encapsulated into each vacuum chamber while the vacuum chamber is at atmospheric pressure, individually evacuating each vacuum chamber at one of the indexing positions with the first vacuum system, following the loading step, providing a level of vacuum which will enable each vacuum chamber to enter the second vacuum system without substantially affecting the level of vacuum in the second vacuum system, transferring each vacuum chamber to the second vacuum system, following the step of evacuating each vacuum chamber, indexing each vacuum chamber through a plurality of index positions while connected to the second vacuum system, simultaneously interconnecting the vacuum chambers in these index positions through the second vacuum system, introducing a resin system into the mold disposed in each vacuum chamber at one of the index positions at which the vacuum chamber is connected to the second vacuum system, degassing the resin system after is is introduced into each mold at another of the indexing positions while the vacuum is being maintained in its associated vacuum chamber by the second vacuum system, disconnecting each vacuum chamber from the second vacuum system, following the degassing step, without affecting the level of vacuum in the second vacuum system, returning each vacuum chamber to atmospheric pressure after it has been disconnected from the second vacuum system, and removing the mold and the resin system disposed therein from each vacuum chamber, after each vacuum chamber is returned to atmospheric pressure.

4. The process of claim 3 wherein the resin system introduced into the vacuum chambers has been prepared by the steps of heating certain of the components of the resin system, introducing the components of the resin system into a mixing chamber, heating the mixing chamber, evacuating the mixing chamber, and mixing the ingredients while the chamber is evacuated.

5. The process of claim 4 including the step of returning the mixing chamber to atmospheric pressure after mixing to facilitate the introduction of the resin system into the evacuated vacuum chamber.

* * * * *